United States Patent
Kisaka et al.

(10) Patent No.: US 9,698,932 B2
(45) Date of Patent: Jul. 4, 2017

(54) OPTICAL TRANSMISSION/RECEPTION SYSTEM, TRANSMITTER, RECEIVER, AND OPTICAL TRANSMISSION/RECEPTION METHOD

(71) Applicant: NIPPON TELEGRAPH AND TELEPHONE CORPORATION, Chiyoda-ku, Tokyo (JP)

(72) Inventors: Yoshiaki Kisaka, Musashino (JP); Koichi Ishihara, Musashino (JP); Masahito Tomizawa, Musashino (JP); Etsushi Yamazaki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 51 days.

(21) Appl. No.: 14/778,824

(22) PCT Filed: Mar. 14, 2014

(86) PCT No.: PCT/JP2014/056903
§ 371 (c)(1),
(2) Date: Sep. 21, 2015

(87) PCT Pub. No.: WO2014/148387
PCT Pub. Date: Sep. 25, 2014

(65) Prior Publication Data
US 2016/0065326 A1 Mar. 3, 2016

(30) Foreign Application Priority Data
Mar. 22, 2013 (JP) ................................ 2013-060592

(51) Int. Cl.
H04J 14/06 (2006.01)
H04B 10/077 (2013.01)
(Continued)

(52) U.S. Cl.
CPC ............ H04J 14/06 (2013.01); H04B 10/077 (2013.01); H04B 10/50 (2013.01); H04B 10/516 (2013.01);
(Continued)

(58) Field of Classification Search
CPC ..... H04J 14/06; H04B 10/516; H04B 10/079; H04B 10/077
See application file for complete search history.

(56) References Cited

U.S. PATENT DOCUMENTS

2010/0189445 A1  7/2010 Nakashima et al.
2012/0069854 A1* 3/2012 Suzuki ................ H04B 10/611
                                              370/465
(Continued)

FOREIGN PATENT DOCUMENTS

EP   2 343 846 A2   7/2011
EP   2 521 293 A1  11/2012
(Continued)

OTHER PUBLICATIONS

Tanimura et al., "In-band FSK Supervisory Signaling between Adaptive Optical Transceivers Employing Digital Signal Processing", ECOC Technical Digest 2011, OSA We. 7. A. 6.
(Continued)

*Primary Examiner* — David Payne
*Assistant Examiner* — Casey Kretzer
(74) *Attorney, Agent, or Firm* — Carrier Blackman & Associates, P.C.; Joseph P. Carrier; William D. Blackman

(57) ABSTRACT

An optical transmission and reception system includes a transmitter and receiver. The transmitter differentially encodes control information to generate a differentially coded signal; uses the differentially coded signal to modulate a signal sequence in which electricity concentrates at a particular frequency; applies time-division multiplexing on
(Continued)

the modulated signal sequence and a primary signal in one of two polarized wave components, and applies time-division multiplexing on the other polarized wave components and the signal sequence itself; and polarization-multiplexes the both of the time-division multiplexed polarized waves into an optical signal; and transmits the optical signal to the receiver. The receiver polarization-demultiplexes the received optical signal to generate two polarized wave signals; extracts the signal sequence in which electricity concentrates at the particular frequency from the two polarized wave signals; and applies differential detection on the extracted signal sequence to demodulate the control information.

10 Claims, 8 Drawing Sheets

(51) Int. Cl.
  *H04B 10/516* (2013.01)
  *H04B 10/532* (2013.01)
  *H04B 10/61* (2013.01)
  *H04L 27/20* (2006.01)
  *H04B 10/50* (2013.01)

(52) U.S. Cl.
  CPC ......... *H04B 10/532* (2013.01); *H04B 10/614* (2013.01); *H04B 10/6162* (2013.01); *H04L 27/2096* (2013.01)

(56) References Cited

U.S. PATENT DOCUMENTS

| | | | |
|---|---|---|---|
| 2012/0207475 A1* | 8/2012 | Tian | H04B 10/0779 398/65 |
| 2012/0288274 A1* | 11/2012 | Li | H04B 10/0775 398/16 |

FOREIGN PATENT DOCUMENTS

| | | |
|---|---|---|
| JP | 2010-178090 A | 8/2010 |
| JP | 2012-199855 A | 10/2012 |
| WO | 2010/134321 A1 | 11/2010 |

OTHER PUBLICATIONS

Kudo et al., "Coherent Optical Single Carrier Transmission Using Overlap Frequency Domain Equalization for Long-Haul Optical Systems", Journal of Lightwave Technology, vol. 27, No. 16, Aug. 15, 2009.

Partial supplementary European Search Report issued Sep. 16, 2016 in the corresponding EP patent application 14768156.3.

Xie et al., "Suppression of Intrachannel Nonlinear Effects With Alternate-Polarization Formats", Journal of Lightwave Technology, IEEE Service Center, Mar. 1, 2004, vol. 22, No. 3, pp. 806-812, New York, NY.

* cited by examiner

OPTICAL TRANSMISSION/RECEPTION SYSTEM, TRANSMITTER, RECEIVER, AND OPTICAL TRANSMISSION/RECEPTION METHOD

TECHNICAL FIELD

The present invention relates to a technique to transmit and receive control information without depending on a state of demodulation of a primary signal in an optical transmission and reception system.

BACKGROUND ART

In recent years, an optical fiber transmission has used coherent reception in which a local oscillation laser is provided in a receiver to mix a received optical signal and an electric field, and been able to transmit and receive two bits or four bits per symbol using multilevel phase shift keying such as Quadrature Phase Shift Keying (QPSK) and 16 Quadrature Amplitude Modulation (16QAM).

A laser of a transmitter and a local oscillation laser of a receiver randomly vary in their relative phase. Accordingly, a disclosure is made of an art to extract a phase-modulated signal by converting a coherently received signal to a digital signal through an analog-to-digital converter (hereinafter, referred to as AD converter), performing digital signal processing using a digital signal processing device, to remove random variations in the relative phase between a laser of a transmitter and a laser of a receiver.

Meanwhile, a digital signal processing device allows an easy execution of digital signal processing, which enables coping with various types of transmission deterioration by sending auxiliary control information for a successful transmission of a primary signal representing primary information to be sent.

For example, compensation for a linear waveform distortion such as wavelength dispersion and a nonlinear waveform distortion in an optical fiber transmission line is able to be performed in the transmitter as well as the receiver. Specifically, for the wavelength dispersion among the waveform distortion, the transmission deterioration of the primary signal can be improved by optimally adjusting the compensation amount in the transmitter and receiver respectively than compensation in either one of the transmitter or receiver. In this case, the receiver detects an amount to be compensated and sends the detection result to the transmitter as auxiliary information, which information can be utilized by the transmitter for calculating the compensation amount.

Additionally, for another example, notifying the receiver of a modulation scheme as the control information from the transmitter enables the digital signal processing device to be used to switch a modulation scheme according to a situation of the transmission deterioration and to receive the primary signal in the modulation scheme switched.

Non-Patent Literature 1 discloses a technique of superimposing frequency-modulated auxiliary control information into a primary signal to transmit the auxiliary control information for the primary signal.

CITATION LIST

Non-Patent Literature

Non-Patent Literature 1: Takahito Tanimura, et al, "In-band FSK Supervisory Signaling between Adaptive Optical Transceivers Employing Digital Signal Processing", ECOC 2011 We.7.A.6.

Non-Patent Literature 2: R. Kudo, et al, "Coherent optical single carrier transmission using overlap frequency domain equalization for long-haul optical systems", J Lightw Technol, vol 27, no 16, pp. 3721-3728, August 2009.

SUMMARY OF INVENTION

Technical Problem

However, in the technique described in Non-Patent Literature 1, superimposing the frequency modulated control information into the primary signal causes the primary signal to be deteriorated due to frequency offset.

Accordingly, it is an object of the present invention to provide a technique for transmitting and receiving control information without deteriorating the primary signal and without depending on the state of demodulation of the primary signal in an optical transmission and reception system.

Here, note that the state of demodulation of the primary signal includes not only a state of successfully demodulating the primary signal, but also a state in which a signal sequence of the primary signal are not yet demodulated or not able to be correctly demodulated, for example, a state of failing to establish clock synchronization, a state of failing to compensate the wavelength dispersion on the transmission line, a state of failing to separate polarization-multiplexed signal, and a state of failing to compensate for waveform distortion due to polarization mode dispersion.

Solution to Problem

An optical transmission and reception system according to the present invention includes a transmitter having a known signal generator configured to output a known signal sequence, a control signal modulator configured to modulate the known signal sequence using control information, a polarization-multiplexer configured to apply electro-optical transduction on the output signals of the known signal generator and the control signal modulator respectively and to polarization-multiplex the output signals transduced, and to generate an optical signal; and the receiver having a reception-transducer configured to receive the optical signal outputted from the transmitter and to transduce the received optical signal into a digital received-signal separated by every polarized wave component, and a control signal demodulator configured to extract a phase relationship between the polarized wave components to demodulate the control information based on the phase relationship extracted.

According to this configuration, the transmitter polarization-multiplexes a signal obtained by modulating a known signal sequence using the control information and the known signal sequence to generate an optical signal and to transmit it to the receiver. The receiver is able to convert the received optical signal into a digital received-signal separated by every polarized wave component, to extract a phase between the polarized wave components, and to demodulate the control information based on the phase extracted. Therefore, the optical transmission and reception system is able to transmit and receive the control information without depending on the state of demodulation of the transmitted signal (primary signal).

Additionally, the transmitter of the optical transmission and reception system further includes a first signal multiplexer configured to receive and modulate a first polarized wave of transmission information to generate a first primary signal and to apply time-division multiplexing on the first primary signal generated and the output signal of the known signal generator, and a second signal multiplexer configured to receive and modulate a second polarized wave of transmission information to generate a second primary signal and to apply time-division multiplexing on the second primary signal generated and the output signal of the control signal modulator.

According to this configuration, the optical transmission and reception system apply time-division multiplexing on a signal relating to control information and the primary signal, and therefore never deteriorate the primary signal. Also, the optical transmission and reception system is able to transmit and receive the control information without depending on the state of demodulation of the primary signal.

In addition, in the optical transmission and reception system, the transmitter has the known signal generator further configured to generate and output a signal sequence in which electricity concentrates in a particular frequency, and the receiver further includes a known signal detector configured to identify, on the basis of the particular frequency, a position of the signal sequence in which the electricity concentrates in the particular frequency, and the control signal demodulator is further configured to extract the signal sequence in which the electricity concentrates at the particular frequency from the digital received-signal separated by each of the polarized wave components on the basis of the position identified by the known signal detector and to demodulate the control information on the basis of the signal sequence extracted.

According to this configuration, the transmitter is configured to modulate the signal sequence of which electricity concentrates at the particular frequency according to the control information. Further, the receiver is able to identify, on the basis of the particular frequency, the position of the signal sequence in which the electricity concentrates at the particular frequency, and to extract, on the basis of the position identified, the signal sequence in which the electricity concentrates at the particular frequency, and to demodulate the control information on the basis of the signal sequence extracted. That is, the optical transmission and reception system is able to transmit and receive the control information without depending on the state of demodulation of the primary signals.

In addition, in the optical transmission and reception system, the transmitter has the control signal modulator configured to differentially code the control information into a differentially coded signal, and to modulate the signal sequence in which electricity concentrates at the particular frequency, using the differentially coded signal; and therefore, the receiver is able to have the control signal demodulator configured to extract, on the basis of the position identified by the known signal detector, the signal sequence in which the electricity concentrates at the particular frequency from the digital received-signal separated by each of the polarized wave components and to apply differential detection to the signal sequence extracted to demodulate the control information.

According to this configuration, the transmitter generates a differentially coded signal by differentially coding control information and modulating a signal sequence in which electricity is concentrated in a particular frequency by the differentially coded signal. Thus, the receiver is able to, on the basis of the particular frequency, identify the position of the signal sequence in which the electricity concentrates at the particular frequency, to extract, on the basis of the position identified, the signal sequence in which the electricity concentrates at the particular frequency and to apply differential detection on the signal sequence extracted, to demodulate the control information. That is, the optical transmission and reception system is able to transmit and receive the control information without depending on the state of demodulation of the primary signals.

Furthermore, the receiver of the optical transmission and reception system is configured to compensate for the frequency offset, when extracting the signal sequence in which the electricity concentrates at the particular frequency from the digital received-signal.

According to this configuration, the receiver, by compensating the frequency offset, is able to compensate for deviation of the particular frequency in the signal sequence in which the electricity concentrates at the particular frequency. Therefore, the optical transmission and reception system is able to transmit and receive the control information without depending on the state of demodulation of the primary signals, by executing the extraction of the signal sequence in which the electricity concentrates at the particular frequency, on the basis of the frequency compensated for the frequency offset.

Furthermore, the receiver of the optical transmission and reception system is configured to convert the digital received-signal separated by every polarized wave component into a signal in a frequency domain to estimate the frequency offset when compensating for the frequency offset. Additionally, the receiver is configured to apply Fast Fourier Transform (FFT) on the digital received-signal separated by every polarized wave component to obtain the signal in the frequency domain when estimating the frequency offset.

According to this configuration, the receiver is able to estimate the frequency offset to compensate for the deviation of the particular frequency in the signal sequence in which the electricity concentrates at the particular frequency. Therefore, the optical transmission and reception system is able to transmit and receive the control information without depending on the state of demodulation of the primary signal, by executing the extraction of the signal sequence in which the electricity concentrates at the particular frequency, on the basis of the frequency compensated for the frequency offset.

Furthermore, the receiver of the optical transmission and reception system is provided with a determinator in the control signal demodulator, the determinator normalizes the digital received-signal separated by every polarized wave component before bit determination to use the digital received-signal normalized and to perform bit determination.

According to this configuration, the optical transmission and reception system is able to transmit and receive the control information, while being immune from variable factors such as time-dependent variations in the optical fiber transmission line and fluctuation of the transmission signal.

Note that the invention relating to the transmitter, the receiver, and a method for optical transmission and reception is provided with the same technical features and effects as a part or the whole of the optical transmission and reception system, and therefore their descriptions are omitted.

Advantageous Effects of Invention

The present invention enables the optical transmission and reception system to transmit and receive the control information without deteriorating the primary signal and without depending on the state of demodulation of the primary signal.

DESCRIPTION OF EMBODIMENTS

Mode for carrying out the present invention (hereinafter, referred to as the "present embodiment") is described in detail with reference to the drawings appropriately as needed.

<Optical Transmission and Reception System>

Figure 1:
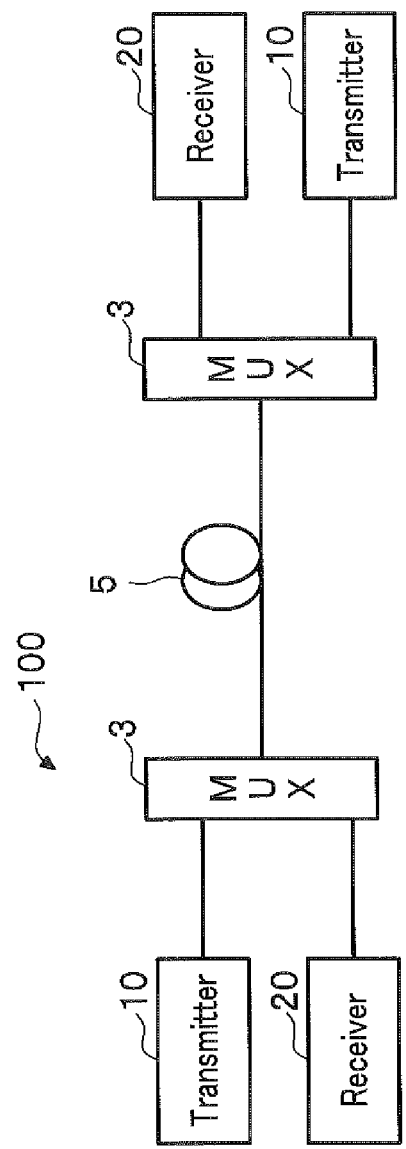
FIG. 1 is a diagram showing an exemplary configuration of an optical transmission and reception system.

First, a description is made of an exemplary configuration of an optical transmission and reception system with reference to FIG. 1.

FIG. 1 schematically illustrates an optical transmission and reception system 100 for performing optical fiber transmission. For example, in the optical transmission and reception system 100 in FIG. 1, the transmitter 10 at the left side in the drawing modulates information to be transmitted to generate an optical signal, and outputs the optical signal to a multiplexer 3. The optical signal is multiplexed with other optical signal (not shown) by the multiplexer 3, passes through an optical fiber 5, and reaches the multiplexer 3 at the right side. Note that the multiplexer 3 has a function of, for example, performing wavelength multiplexing and time-division multiplexing or the like. The multiplexer 3 at the right side extracts the optical signal by demultiplexing and transmits it to the receiver 20. The receiver 20 includes a local oscillation laser (not shown) to carry out coherent reception and obtains the original transmission information from the optical signal.

Note that FIG. 1 shows a configuration which includes the transmitter 10 and the receiver 20 on both sides, but not limited to such a configuration, and it may be thought of another configuration of arranging, for example, only the transmitter 10 at the left side and only the receiver 20 at the right side, and an optical fiber transmission directed only in one way from left to right.

<Transmitter>

Figure 2:
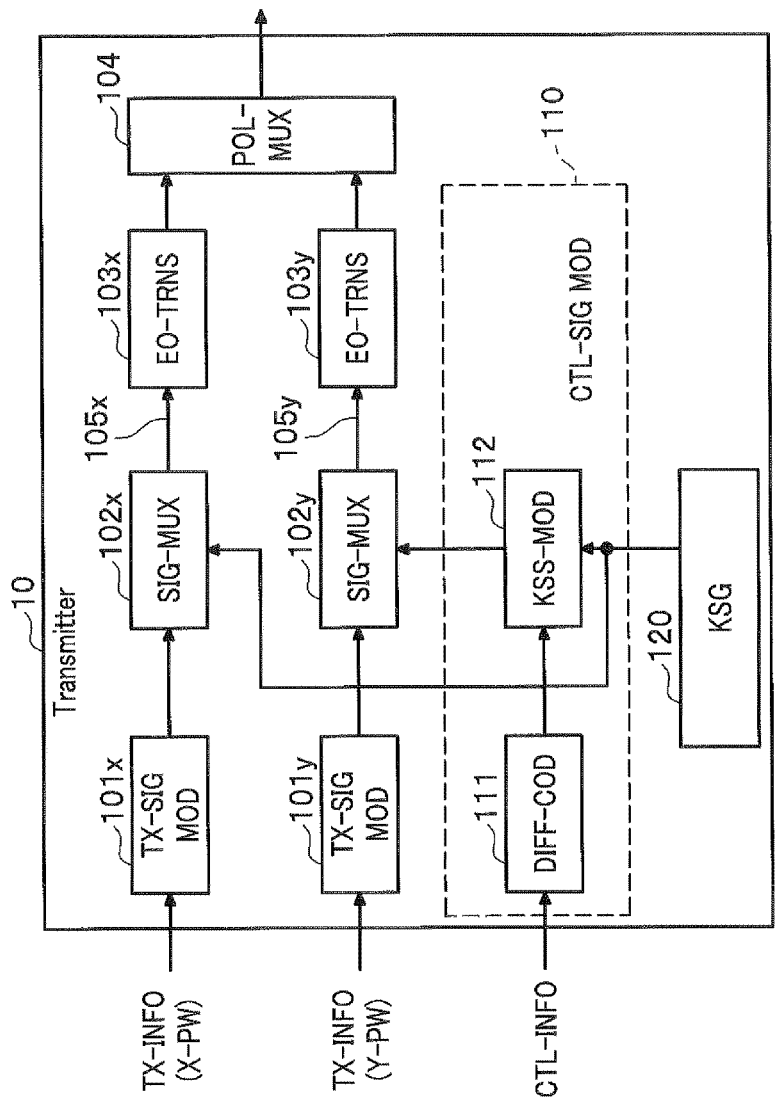
FIG. 2 is a diagram showing an exemplary function of a transmitter.

Here, a description is made of an exemplary function of the transmitter 10 with reference to FIG. 2. As shown in FIG. 2, the transmitter 10 has a function of performing parallel transmission or MIMO (Multiple-Input Multiple-Output Transmission) of information to be transmitted using two orthogonal polarized waves (X polarized wave, Y polarized wave). The transmitter 10 includes transmission signal modulators 101$x$ and 101$y$, signal multiplexers 102$x$ and 102$y$, electro-optical transducers 103$x$ and 103$y$, a polarization-multiplexer 104, a control signal modulator 110, and a known signal generator 120. Note that the "x" attached to the reference sign denotes a processing of the X polarization and the "y" a processing of the Y polarization.

The transmission signal modulator (part of the first signal multiplexer) 101$x$ is configured to have a function of modulating a binary sequence of transmission information to output a transmission symbol sequence (primary signal). The modulation technique includes, for example, Binary Phase Shift Keying (BPSK) modulation, QPSK modulation, or QAM modulation, but, other modulation techniques may also be applicable. Note that the transmission signal modulator (part of the second signal multiplexer) 101$y$ has the same function as the transmission signal modulator 101$x$.

The known signal generator 120 is configured to have a function of generating and outputting as a known signal sequence, any signal sequence such as pseudo-noise (PN; Pseudo random Noise) sequence and a signal sequence in which electricity concentrates at two or more particular frequencies or a narrow band including the particular frequency (hereinafter, sometimes referred to as a particular frequency band signal sequence). Note that the term "known" is intended to mean that both of the transmitter 10 and the receiver 20 share pattern information of the signal sequence. Alternatively, the known signal sequence may be information that can serve as a reference signal, a pilot signal, a training signal, or the like, which is referenced as a criteria.

For the known signal sequence, for example, as the particular frequency band signal sequence, an alternating signal having a relationship in which signal points are point symmetric with respect to the origin of an IQ plane can be used. For an example, generation of a BPSK signal can be achieved by using the alternating signal that repeats two signal points alternately like "−S, S, −S, S, . . . , −S, S". Alternately, generation of a QPSK signal can be achieved by using the alternating signal that repeats two signal points alternately like, "(S, S), (−S, −S), (S, S), (−S, −S), . . . , (S, S), (−S, −S)", or "(S, −S), (−S, S), (S, −S), (−S, S), . . . , (S, −S), (−S, S)", when representing a signal point as (real part, imaginary part). Here, S denotes any real number, and (the real part α, the imaginary part β) can be expressed as α+jβ as a complex number. Note that j is an imaginary unit. This alternating signal is able to generate electricity that concentrates at the two particular frequencies.

Other alternating signals may be used, for example, an alternating signal alternately repeating each of two signal points twice such as "−S, −S, S, S, −S, −S, S, S, . . . , −S, −S, S, S," or an alternating signal repeating each of two signal points M times (M>0, M is integer). Thus, multiplying or convoluting the alternating signals of multiple repetition of each signal point enable the electricity to concentrate at more than four particular frequencies. It is also possible to generate a signal in which electricity concentrates at two or more particular frequencies by superimposing a plurality of sine waves with different periods. Moreover, Orthogonal Frequency Division Multiplexing (OFDM)

scheme may be used to superimpose a signal only onto a particular subcarrier to generate a signal having a particular frequency. Furthermore, it is possible to expand the frequency band at which electricity concentrates by using a particular frequency band signal sequence and other signal sequences to spread the frequency.

The control signal modulator 110 is configured to use a known signal sequence outputted from the known signal generator 120 and the control information to generate and output a modulated signal to a signal multiplexer 102x or 102y. The control signal modulator 110 includes a differential coder 111 and a known signal sequence modulator 112.

The differential coder 111 is configured to input the control information sequence to be transmitted and to differentially code the control information sequence by each bit to generate a differentially coded signal. Representing the n-th control information (n≥0 and an integer) as C(n) (C(n) is binary of 1 or 0), the n-th output D(n) from the differential coder 111 can be expressed by an exclusive OR of the C(n) and D(n−1), as shown in the following equation (1).

[Math. 1]

$$D(n)=C(n)\oplus D(n-1) \quad \text{Equation (1)}$$

Note that D(−1)=1.

The differential coder 111 outputs the differentially coded signal D(n) generated to the known signal sequence modulator 112.

The known signal sequence modulator 112 modulates a known signal sequence received from the known signal generator 120 for each bit by a differentially coded signal received from the differential coder 111 to generate a modulated known signal sequence. Specifically, assuming that the known signal sequence is "−S, S, −S, S, . . . , −S, S", the known signal sequence modulator 112 outputs"−S, S, −S, S, . . . −S, S" when the output from the differential coder 111, D(n)=1. On the other hand, the known signal sequence modulator 112 inverts the sign and outputs "S, −S, S, −S, . . . , S, −S," when the output from the differential coder 111, D(n)=0. Note that the inversion of the sign can be reversed from the manner described above between the case of D(n)=1 and D(n)=0.

FIG. 2 shows a case in which the control signal modulator 110 outputs a known signal sequence to the signal multiplexer (the first signal multiplexer) 102x without modulation, and a modulated known signal sequence to the signal multiplexer (the second signal multiplexer) 102y. It should be understood that the inversed case is available, in which the known signal sequence is outputted as is to the signal multiplexer 102y and the modulated known signal sequence is outputted to the signal multiplexer 102x.

The signal multiplexer 102x is configured to insert (time-division multiplex) a sequence of Nt known signals (Nt≥1, Nt is an integer) after every sequence of Ns transmission symbols (primary signal; Ns≥1, Ns is an integer) to generate a signal sequence 105x. And, the signal multiplexer 102y is configured to insert a sequence of Nt modulated known signals after every sequence of Ns transmission symbols (primary signals) to generate a signal sequence 105y.

The electro-optical transducer 103x (103y) is configured to perform electro-optical transduction of the signal sequence 105x (105y) to output a light signal.

And then, the polarization-multiplexer 104 is configured to perform polarization-multiplexing of each of the light signals from the electro-optical transducers 103x and 103y to generate and output optical signals.

Figure 3:
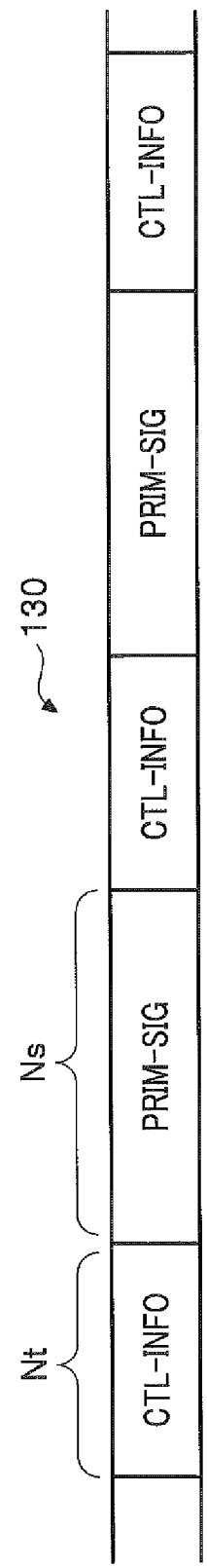
FIG. 3 is a diagram showing an exemplary transmission signal sequence.

A transmission signal sequence 130 outputted by the polarization-multiplexer 104, as shown in FIG. 3, is formed by time-division multiplexing of the Nt control signals (the known signal sequence or the modulated known signal sequence) between the sequences of the Ns primary signals (transmission symbol sequence).

Note that the above description describes the configuration which transmits the transmission signal sequence 130 generated by time-division multiplexing the known signal sequences and the transmission symbols (primary signals). However, such a configuration need not be essential, but a configuration of continuously transmitting only the known signal may be used. In this configuration, the transmission signal modulators 101x and 101y and the signal multiplexer 102x and 102y are unnecessary, and the transmission signal sequence 130 of FIG. 3 is configured to be the sequence of the Nt control signals continuously transmitted, which is equivalent to the transmission signal sequence with Ns=0.

<Receiver>

Figure 4:
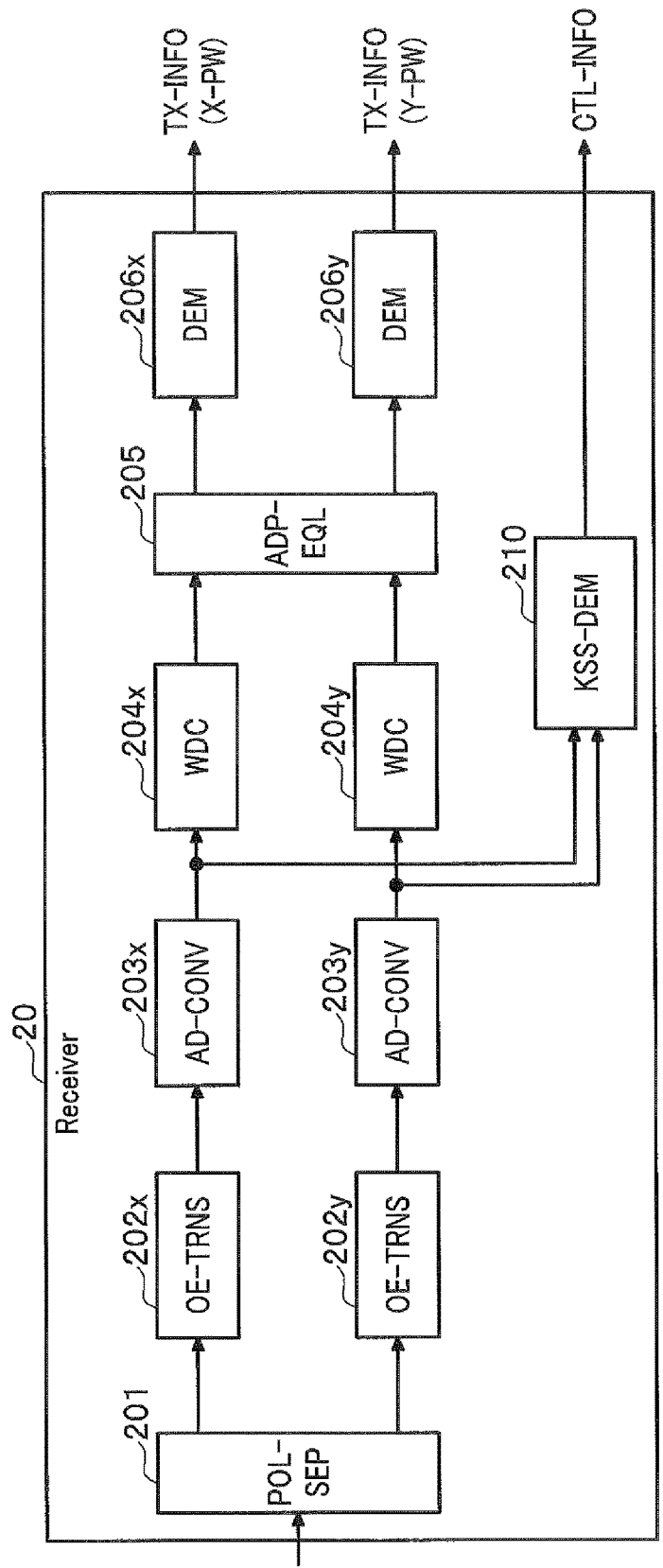
FIG. 4 is a diagram showing an exemplary function of a receiver.

Next, a description is made of an exemplary function of the receiver 20 with reference to FIG. 4 (referring to FIG. 1 as needed).

The receiver 20 includes a polarization separator (a part of reception side converter) 201, opto-electric transducers (parts of reception side converters) 202x and 202y, AD converters (parts of reception side converters) 203x and 203y, wavelength dispersion compensators 204x and 204y, an adaptive equalizer 205, demodulators 206x and 206y, and a known signal sequence demodulator 210.

The polarization separator 201 is configured to receive an optical signal that is sent by the transmitter 10 and propagates through the optical fiber 5 and the multiplexers 3 to arrive at the receiver, and to perform polarization-separation of and divide the optical signal received in an optical domain into two orthogonal polarized waves (X polarized wave and Y polarized wave) to output the respective polarized waves to the opto-electric transducers 202x and 202y. Specifically, the polarization separator 201 includes, for example, a polarization-diversity-90-degree hybrid-coupler and the local oscillation laser to perform the polarization-separation. The X polarized wave is outputted to the opto-electric transducer 202x, and Y polarized wave the opto-electric transducer 202y.

The opto-electric transducer 202x is configured to convert the X polarized wave received from the polarization separator 201 into an electric signal, and to output the electric signal to the AD converter 203x. Specifically, the opto-electric transducer 202x uses the local oscillation laser to separate the optical electric field of the received optical signal into quadrature components and to convert the quadrature components to electrical analog signals. The opto-electric transducer 202y is configured to perform the same operation as the opto-electric transducer 202x on the Y polarized wave.

The AD converter 203x (203y) is configured to convert the electrical analog signal received from the opto-electric transducer 202x (202y) into a digital signal to generate and output a digital received-signal.

The wavelength dispersion compensator 204x (204y) is configured to receive the digital received-signal from the AD converter 203x (203y), and to output a signal obtained by compensating for signal distortion due to wavelength dispersion.

The adaptive equalizer 205 is configured to input the signal compensated by the wavelength dispersion compensator 204x and 204y, to compensate distortion of the inputted signal due to polarization mode dispersion, on the way of transmission and reception, and in the transmission line, and to output the signal compensated.

The demodulator 206x is configured to input the output signal from the adaptive equalizer 205, to demodulate the transmission symbol sequence transmitted on the X polarized wave (primary signal), and to output the original transmission information demodulated. The demodulator 206y is configured to input the output signal from the adaptive equalizer 205, to demodulate the transmission symbol sequence transmitted on the y polarized wave (primary signal), and to output the original transmission information demodulated.

The wavelength dispersion compensators 204x and 204y and the adaptive equalizer 205 each may be applied with technologies of Frequency Domain Equalization (FDE) and Time Domain Equalization (TDE) described in the Non-Patent Literature 2.

Next, for the known signal sequence demodulator 210, three exemplary functions are described as the first, second, and third embodiment respectively, with reference to FIGS. 5A, 5B, 6, and 7.

First Embodiment

Figure 5A:
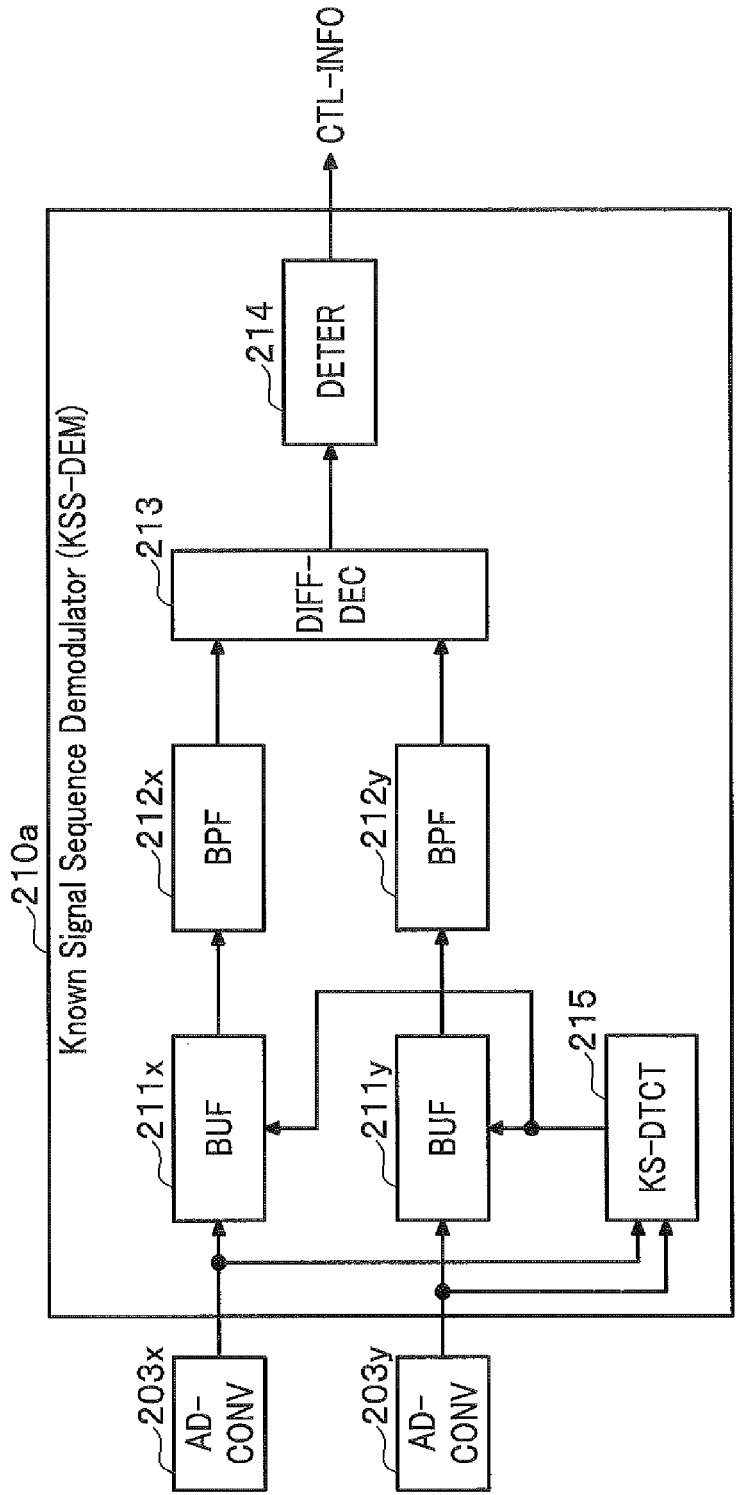
FIG. 5A is a diagram showing an exemplary function of a receiver in the first embodiment.

The known signal sequence demodulator 210a in the first embodiment is described with reference to FIG. 5A. As shown in FIG. 5A, the known signal sequence demodulator 210a includes buffers (a part of the control signal demodulator) 211x and 211y, a Band Pass Filters (BPFs) 212x and 212y, a differential decoder (a part of the control signal demodulator) 213, a determinator (a part of the control signal demodulator) 214, and a known signal detector 215. Note that the term "differential detection" and "differential decoding" have the same meaning.

The known signal detector 215 is configured to detect a position where the known signal sequence is inserted, for the digital received-signal received from the AD converters 203x and 203y, and to output the position as timing information (frame synchronization information) to the buffers 211x and 211y.

Here, a method for detecting the insertion position of the known signal sequence includes, for example, if the known signal sequence is a particular frequency band signal sequence: calculating signal electricity of a band (band calculated by also taking into consideration of influence due to the frequency offset) in which a particular frequency (or a narrow band containing the particular frequency) can exist in the digital received-signal; and detecting as the insertion position of the known signal sequence, a position in which the signal electricity calculated exceeds a predetermined threshold value, or a position in which the signal electricity calculated arrives at a peak in the range where the signal electricity calculated exceeds a predetermined threshold value. In other words, the known signal detector 215, identifies a position of the signal sequence in which electricity concentrates at a particular frequency among the digital received-signal for each polarized wave. Or, the known signal detector 215 may obtain a cross correlation between the known signal sequence stored in the receiver side and the digital received-signal sequence, and detect a peak position of the cross correlation as the insertion position of the known signal sequence.

The buffers 211x (211y) is configured to temporarily buffer the digital received-signal in the X polarization (Y polarization) outputted from the AD converter 203x (203y), to extract a segment containing the known signal sequence on the basis of the timing information received from the known signal detector 215, and to output the signal in the segment. And then, the buffer 211x (211y) deletes sequences other than the extracted segment from the buffer.

Note that a length of the segment cut out by the buffers 211x and 211y to contain the known signal sequence is preferably longer than a length of the known signal sequence itself. It is because there is a case in which various distortions may influence the digital received-signal in the transmission and reception process such as the optical transmission to cause the signal waveform of the known signal sequence to be extended outside the segment of the original known signal sequence. Additionally, it is also because the known signal detector 215 requires the segment of the sufficient length to be cut out for the analysis to obtain the timing information using the digital received-signal affected by such distortions. It should be understood that, as mentioned above, no buffer is required in the configuration of transmitting only the known signal sequence continuously (Ns=0).

The BPF 212x (212y) is configured to receive the segment that is extracted by the buffer 211x (211y) and includes the known signal sequence, to perform processing for passing through the frequency band of ±Δf around the center spectrum at which electricity concentrates and is generated from the genuine known signal sequence, and to output the signal processed for the frequency band.

For example, a description is given of a case of transmitting by 30 Gbaud as a known signal sequence a signal having two particular frequencies generated by the alternating signal of "−S, S, −S, S, . . . , −S, S". The BPF units 212x and 212y include BPFs having center frequencies of 15 GHz and −15 GHz, and respective bandwidths of ±Δf therearound. Here, the value of Δf is preferably, for example, set to Δf=5 GHz, when the assumable maximum frequency offset is 5 GHz. As an alternative, the value of Δf is preferably set to, for example, less than 3.75 GHz (i.e., Δf<3.75 GHz) that corresponds to ⅛ of 30 Gbaud, as a value such as to cut off a signal other than a signal with a desired specified frequency. As yet another alternative, the value of Δf is preferably set to, when the frequency offset compensation is performed in a processing prior to that of the BPF unit 212x and 212y, for example, approximately 1 MHz as a value of an order of a laser line width, to cut out the known signal component. In the case in which the frequency offset compensation is not performed, it is preferable to perform frequency offset estimation to use a BPF with center frequencies of (15+f0) GHz and (−15+f0) GHz for the estimated frequency offset of f0 GHz, and with respective bandwidths of ±Δf around the center frequencies.

Furthermore, if there exists a spectrum including a plurality of particular frequencies at which electricity concentrates, it is not necessary for the BPF to pass spectrums for all the particular frequencies, but it is sufficient for the BPF to pass at least one spectrum for the particular frequencies. For example, in the case of the known signal having a peak value at 15 GHz and −15 GHz as described above, it is sufficient for the BPF to pass at least either one of the 15 GHz and −15 GHz.

Alternatively, for the spectrum having the plurality of particular frequencies at which electricity concentrates, a plurality of BPFs may be provided, wherein the center frequencies of the plurality of the BPFs are respective spectrums of the plurality of the particular frequencies at which electricity concentrates. For example, in the case of the known signal having peak values at the above 15 GHz and −15 GHz, it is sufficient to provide a total of two BPFs having the bandwidth of ±Δf around 15 GHz and the bandwidth of ±Δf around −15 GHz.

The differential decoder 213 is configured to function to differentially decode the output signals from the BPF units 212x and 212y as input signals and to generate a differentially decoded signal. When expressing respective output signals from the BPF units 212x and 212y in the n-th frame as Rx(n, k) and Ry(n, k), the differentially decoded signal Z(n) is expressed by the following equation (2).

[Math. 2]

$$Z(n) = \sum_{k=0}^{K-1} Rx(n, k)Rx^*(n-1, k) + \sum_{k=0}^{K-1} Ry(n, k)Ry^*(n-1, k) \quad \text{Equation (2)}$$

Note that sign "*" denotes a complex conjugate, and that "K" denotes a length of the digital received-signal stored in the buffer 211x and 212y, and K>k≥0.

Note that, as described above, with respect to the spectrum including the plurality of the particular frequencies at which electricity concentrates, if the BPF unit is provided with the plurality of the BPFs having as the center frequencies, respective particular frequencies at which electricity concentrates, each of the BPF output results may be processed with equation (2), and the processed results or the electricity values of the processing results may be synthesized (for example, by addition, etc.), and the synthesized value may be used as Z(n).

The determinator 214 is configured to function to input the differentially decoded signal outputted from the differential decoder 213, to perform the bit determination for the differentially decoded signal and to demodulate the differentially decoded signal to the original sequence of the control information. Here, assuming that the differentially decoded signal in the n-th frame is expressed as Z(n), and that the known signal sequence is "−S, S, −S, S, . . . , −S, S" as described above, when the output of the differential encoder 111 is, D(n)=1, the known signal sequence modulator 112 outputs "−S, S, −S, S, . . . , −S, S". On the other hand, when the output of the differential encoder 111 is, D(n)=0, the known signal sequence modulator 112 inverts the sign to output "S, −S, S, −S, . . . . S, −S,". In other words, the determination result (control information sequence), P(n) is expressed by the following equation (3).

[Math 3]

$$P(n) = \begin{cases} 0, & \text{if } |Z(n)| \geq P_{th} \\ 1, & \text{otherwise} \end{cases} \quad \text{Equation (3)}$$

Here, $P_{th}$ (>0) is a determination threshold value.

The above demodulation scheme is independent on the modulation scheme. Accordingly, even under a condition in which the modulation scheme of the optical signal transmitted by the transmitter 10 is not been able to be identified by the receiver 20, the control information is able to be transmitted and received. This enables to notify the modulation scheme from the transmitting side to the reception side via the control information. Conversely, the modulation scheme can be notified via the control information from the reception side to the transmission side.

Additionally, when transmitting information on a frame period (corresponding to Nt+Ns shown in FIG. 3) as the parallel running clock with the control information, it means that the known signal detector 215 is configured to detect the detection position of the control information as a clock having its period as the frame period.

Note that the above description describes the configuration of differential decoding the received signal by detecting the relative phase difference between the known signal sequences of anteroposterior frames by performing the differential coding at the transmitter 10 and the differential decoding at the receiver 20, even without knowing an absolute phase of a polarized wave. However, such a configuration is not necessarily required, but another configuration may be adopted, which does not require the differential coder 111 of the transmitter 10 (see FIG. 2) or the differential decoder 213 of the receiver 20 (see FIG. 5A). In that case, for example, by transmitting the control signal including a reference signal therein, the reception side is able to recognize the absolute phase of the polarized wave on the basis of the reference signal to decode the control signal.

Furthermore, the above description describes the configuration using the BPF units 212x and 212y. However, such a configuration is not necessarily required, but a configuration of, for example, using the PN sequence for the known signal, requires none of the BPF units 212x and 212y because the spectrum of the known signal spreads to the entire signal band.

Figure 5B:
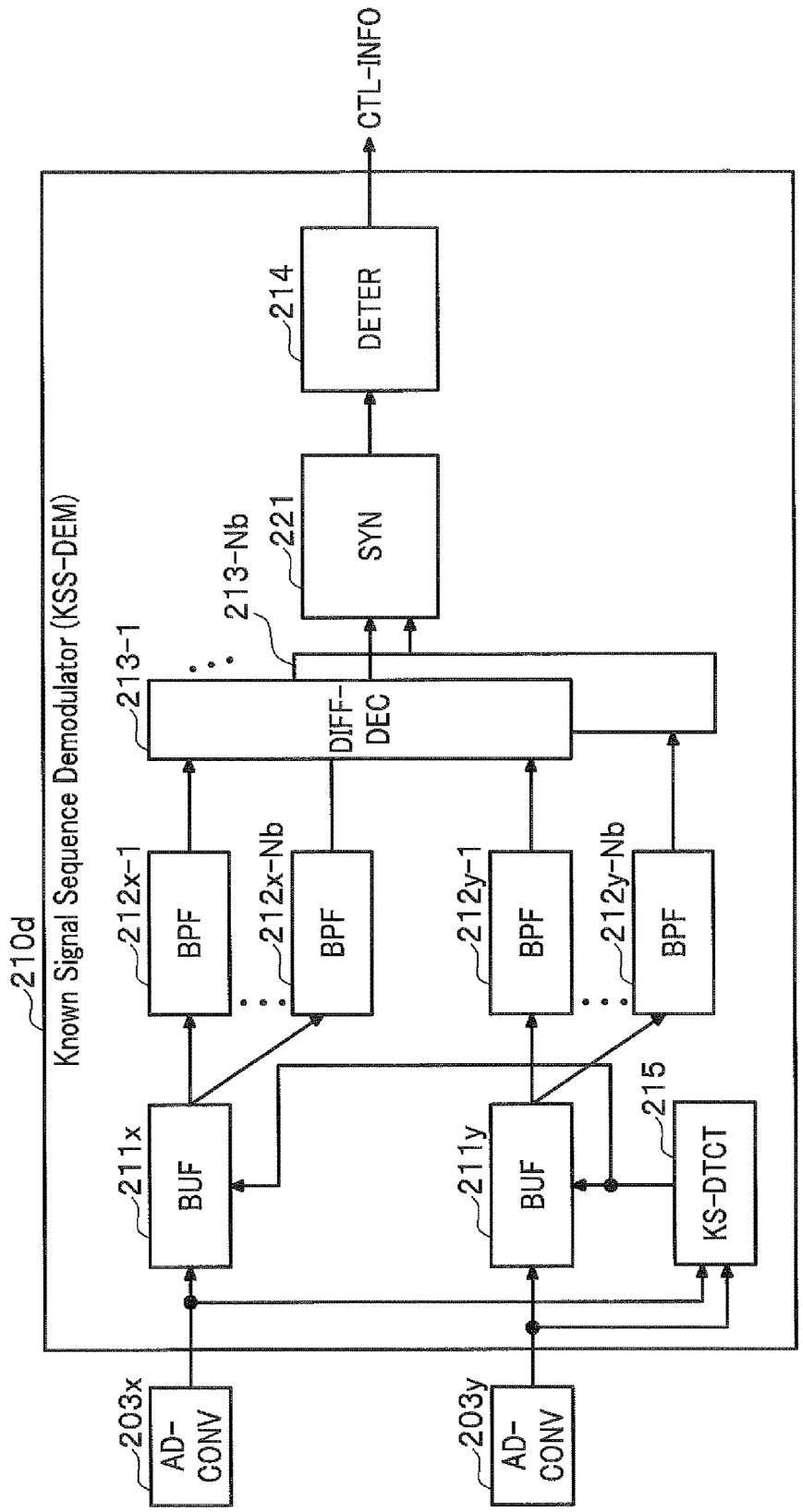
FIG. 5B is a diagram showing an exemplary function of a receiver according to an exemplary modification of the first embodiment.

In the case of using the particular frequency band signal sequence for the known signal sequence, the signal sequence becomes a spectrum with a plurality of particular frequencies at which electricity concentrates, and therefore, it is possible for respective particular frequencies to be prepared and processed with different BPFs. This configuration example (modified example of the first embodiment) is shown in FIG. 5B as a known signal sequence demodulator 210d. The known signal sequence demodulator 210d, as shown in FIG. 5B, is provided with Nb number of BPF units 212x-1 to 212x-Nb, and BPF units 212y-1 to 212y-Nb for the buffers 211x and 211y (Nb≥1, Nb is an integer) respectively, and provided with a differential decoder 213-1 to 213-Nb, and anew a synthesizer 221 to synthesize spectrums of a plurality of frequency bands.

A description is given of a case of a signal having two particular frequencies being transmitted as a known signal sequence at 30 Gbaud, which signal is generated, for example, by the alternating signal "−S, S, −S, S, . . . , −S, S". The BPF units 212x-1 and 212y-1 include respective BPFs with a bandwidth of ±Δf around the center frequency of 15 GHz, and the BPF units 212x-2 and 212y-2 include respective BPFs with a bandwidth of ±Δf around the center frequency of −15 GHz. The differential decoder 213-1 inputs and decodes output signals of the BPF units 212x-1 and 212y-1, and the differential decoder 213-2 inputs and decodes output signals of the BPF units 212x-2 and 212y-2, respectively, and both decoders output the decoded signals to the synthesizer 221. The synthesizer 221 synthesizes a plurality of signals with different frequencies, that is, the spectrum having a center frequency of −15 GHz and the spectrum having a center frequency of 15 GHz. The synthesizing method, for example, includes summing respective electricity values (squared values) or amplitude values.

Further, in the optical transmission having variable factors such as time-dependent fluctuations of the optical fiber transmission line and a variation of the transmission signal, the determinator 214 may normalize the input signal to the determinator 214 using a signal before being differentially decoded (the output signal from the buffer 211x and 211y or the BPF unit 212x and 212y), and then bit-detect the normalized signal. The input signal to the determinator 214 is the output signal of the differential decoder 213 in the configuration shown in FIG. 5A and the output signal of the synthesizer 221 in the configuration shown in FIG. 5B. Note that the signal before being differentially decoded (the output signal from the buffer 211x and 211y or the BPF unit 212x and 212y) is one example, and a moving average or a temporal average using a forgetting factor of the signal before the differential decoding. Additionally, for the $P_{th}$ used for the above description, the determined value may be also varied according to the time-dependent fluctuation by using the output result from the differential decoder 213 or its time average value, and the normalized value or its time average value thereof.

Second Embodiment

Figure 6:
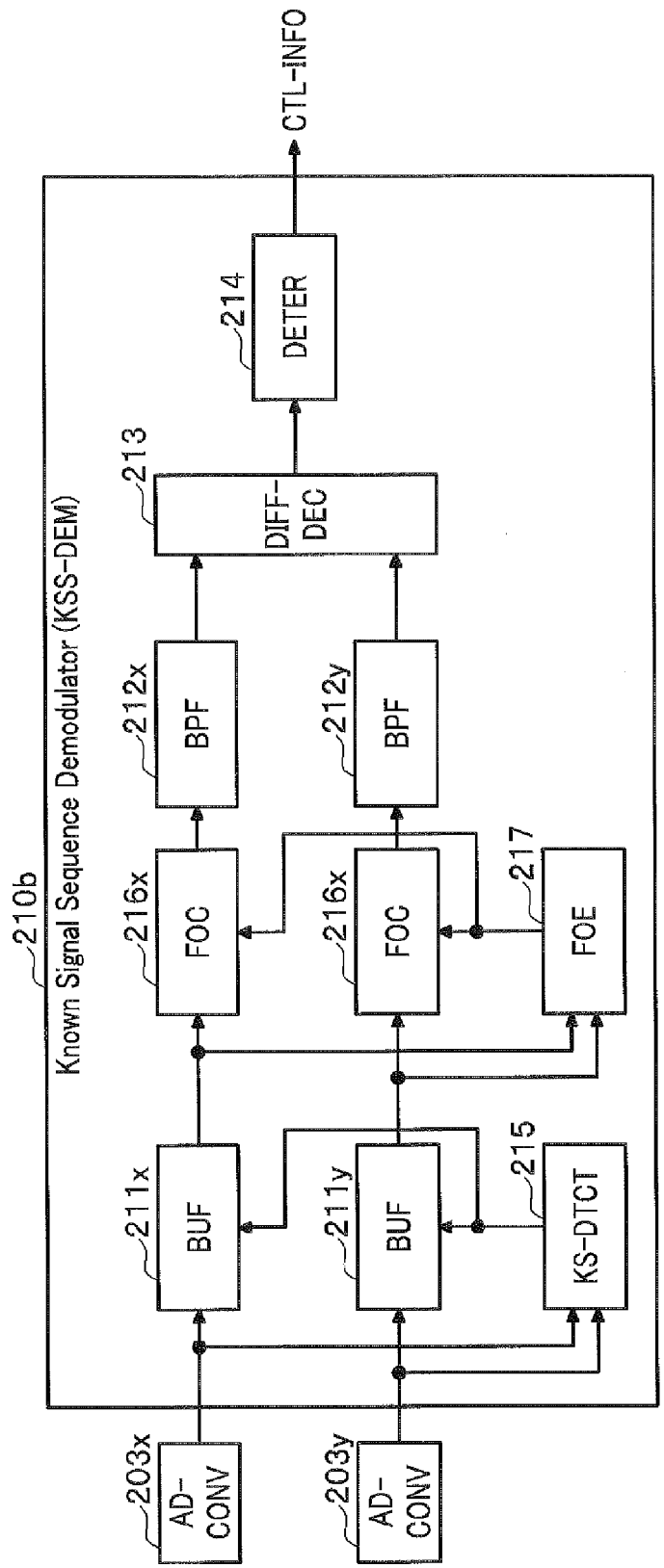
FIG. 6 is a diagram showing an exemplary function of a receiver in the second embodiment.

Next, a description is given on a known signal sequence demodulator 210b in the second embodiment with reference to FIG. 6. As shown in FIG. 6, the known signal sequence demodulator 210b differs from the known signal sequence demodulator 210a shown in FIG. 5A, in that the demodulator 210b is provided with the frequency offset compensator 216x and 216y, and a frequency offset estimator 217. The buffer 211x and 211y, the BPF unit 212x and 212y, the differential decoder 213, the determinator 214, and the known signal detector 215 are the same as those shown in FIG. 5A, and therefore, the same reference signs are assigned thereto, and the description thereon is omitted. Accordingly, here is a description on a function of the frequency offset compensator 216x and 216y (a part of the control signal demodulator), and the frequency offset estimator 217.

The frequency offset estimator 217 is configured to function to receive a signal segment containing the known signal sequence from the buffer 211x and 211y, and to estimate a frequency offset caused by a frequency deviation between the laser of the transmitter 10 and the local oscillation laser of the receiver 20 based on the signal in the segment containing the known signal sequence. The frequency offset estimator 217 is also configured to function to output the frequency offset estimated to the frequency offset compensator 216x and 216y.

Specifically, the frequency offset estimator 217 estimates the frequency deviation at the reception side from the transmission side with respect to a spectrum of each particular frequency generated using the known signal sequence. For example, in the case of transmitting the signal having two particular frequencies generated using the alternating signal "−S, S, −S, S, . . . , −S, S" at 30 Gbaud, the spectrum of the particular frequency should be detected at 15 GHz and −15 GHz. However, if the reception side has a frequency offset 3 GHz, the reception side would detect the peak value of the spectrum at 18 GHz and −12 GHz. In other words, the frequency offset estimator 217 is able to estimate the frequency offset of Δf=3 GHz, based on one or both of the detected peak values (18-15) GHz and (−12-(−15)) GHz.

The frequency offset compensator 216x (216y) is configured to function to receive the frequency offset estimated by the frequency offset estimator 217 to perform frequency offset compensation to the segment of the signal received from the buffer 211x (211y) and containing the known signal sequence. An adaptable method for the frequency offset compensation includes, for example, calculating the phase rotation amount from the frequency offset value obtained with respect to the signal in the time domain and multiplying the inverse phase thereof to perform compensation.

Third Embodiment

Figure 7:
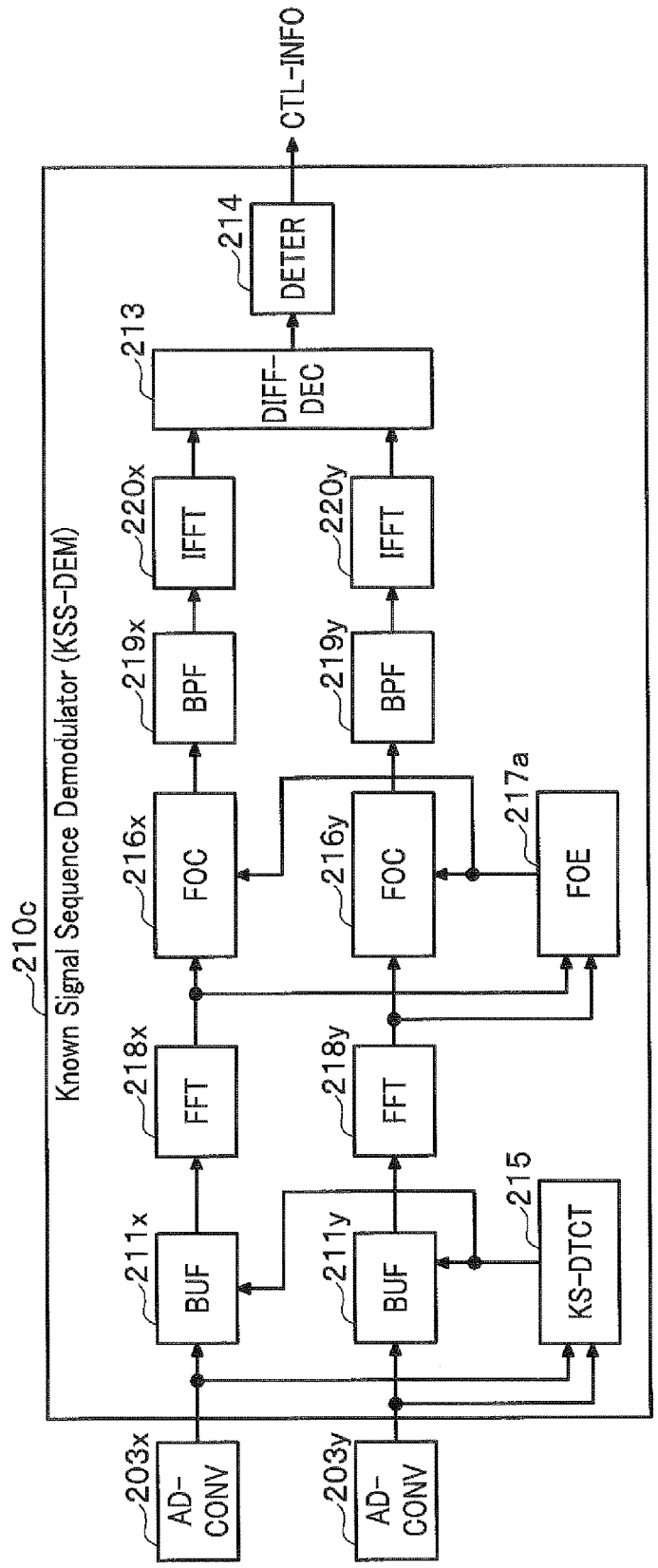
FIG. 7 is a diagram showing an exemplary function of a receiver in the third embodiment.

Next, a description is made on a known signal sequence demodulator 210c in the third embodiment with reference to FIG. 7. As shown in FIG. 7, the known signal sequence demodulator 210c differs from the known signal sequence demodulator 210b shown in FIG. 6, in that the demodulator 210c is provided with a frequency offset estimator 217a, a FFT units 218x and 218y, a filter 219x and 219y, and IFFT (Inverse FFT) units 220x and 220y. The buffers 211x and 211y, the differential decoder 213, the determinator 214, the known signal detector 215, and the frequency offset compensators 216x and 216y are the same as those shown in FIG. 6, and therefore, the same reference signs are assigned thereto and the description thereon is omitted. Accordingly, here is a description mainly on a function of the frequency offset estimator 217a, the FFT units 218x and 218y, the filters 219x and 219y, and the IFFT (Inverse FFT) units 220x and 220y.

The FFT unit 218x (218y) is configured to function to perform N-point (N≥1) FFT transformation on the signal segment received from the buffer 211x (211y) and containing the known signal sequence, to perform frequency conversion, and to output the frequency-converted signal to the frequency offset compensator 216x (216y).

The frequency offset estimator 217a is configured to function to receive the signal in the frequency domain from the FFT unit 218x and 218y to estimate a frequency offset.

Specifically, the frequency offset estimator 217a estimates the frequency deviation at the reception side from the transmission side with respect to a spectrum containing each of particular frequencies generated using the known signal sequence. For example, in the case of transmitting the signal having two particular frequencies generated using the alternating signal "−S, S, −S, S, . . . , −S, S" at 30 Gbaud, the particular frequency should be detected at 15 GHz and −15 GHz. However, if the reception side has a frequency offset of 3 GHz, the reception side would detect the peak values of the spectrum at 18 GHz and −12 GHz. In other words, the frequency offset estimator 217a is able to estimate the frequency offset of Δf=3 GHz, based on one or both of the detected peak values (18-15) GHz and (−12-(−15)) GHz.

The frequency offset compensator 216x (216y) is configured to function to receive the frequency offset from the frequency offset estimator 217a to perform frequency offset compensation in the frequency domain to the output signal (signal in the frequency domain) from the FFT unit 218x (218y), and to output the signal compensated. For example, when receiving the frequency offset of Δf=3 GHz, the frequency offset compensator 216x (216y) performs a −3 GHz of shift on the signal in the frequency domain.

The filter 219x (219y) is configured to function to perform band-filtering of passing through frequencies in a bandwidth of ±Δf around the respective specific frequencies which electricity concentrates at and is generated using the known signal sequence, for a signal in the frequency-domain inputted by the frequency offset compensator 216x (216y), and to output the band-filtered signal.

As an example, a description is given of a case of transmitting the signal having two particular frequencies generated using the alternating signal "−S, S, −S, S, . . . , −S, S" at 30 Gbaud. The filter 219x (219y) includes the BPF with respective bandwidths of ±Δf around the center frequencies 15 GHz and −15 GHz. Here, Δf is set, for example, to approximately Δf=1 MHz as a value of the line width of an assumable maximum laser to cut out the known signal sequence components.

The IFFT unit 220x (220y) is configured to function to perform N-point (N≥1) IFFT transformation on the frequency-domain signal received from the filter 219x (219y) and to perform a time-domain signal.

<Supplementary Explanation>

Here, the supplementary explanations are given on (1) variations and effects of the alternating signals, (2) frame length and accuracy of frame synchronization, (3) characteristics of the BPF, (4) estimation method of frequency offset.

(1) Variations and Effects of the Alternating Signals

In a case of using a pattern using alternatively two signal points like "−S, S, −S, S, . . . , −S, S" as an alternating signal, the spectrum appears in the frequency domain at positions of positive and negative sides of a half frequency of the symbol rate in the frequency domain. For example, when the symbol rate is 32 Gbaud, the spectrum appears at the position of ±16 GHz. Alternatively, in a case of using a alternative pattern like "−S, −S, S, S, −S, −S, S, S, . . . , −S, −S, S, S" as an alternating signal, the spectrum appears at positions of positive and negative sides of a ¼ frequency of the symbol rate. That is, when the symbol rate is 32 Gbaud, the spectrum appears at the position of 8 GHz.

When generating a signal satisfying Nyquist criterion at the transmission side, a signal of an alternating pattern like "−S, S, −S, S, . . . , −S, S" has its electricity attenuated in a signal processing for generating a signal satisfying Nyquist criterion. In contrast, an alternating pattern like "−8, −S, S, S, −S, −S, S, S, . . . , −S, −S, S, S" never have its electricity attenuated because such a signal has an emission line at a half of the frequency of the Nyquist criterion.

Accordingly, the alternating pattern like "−S, −S, S, S, −S, −S, S, S, . . . , −S, −S, S, S", as compared to the alternating pattern "−S, S, −S, S, . . . , −S, S", has an advantage of being immune to electricity attenuation of the alternating pattern accompanying the attenuation of high frequency electricity caused by the transmitter and receiver and a waveform distortion of the alternating pattern caused by the phase rotation.

(2) Frame Length and Accuracy of Frame Synchronization

The length. Nt+Ns, shown in FIG. 3 can be considered as the length for one frame of the transmission signal sequence 130. Matching the frame length with the Optical Transport Unit (OTU) frame enables the frame in FIG. 3 to conform to International Telecommunication Union Telecommunication Standardization Sector (ITU-T) Recommendation G. 709. In other words, if the receiver 20 is able to detect a position of the pattern in which electricity concentrates at a particular frequency, the receiver 20 is able to demodulate the control information using a signal sequence in the vicinity of this position. Therefore, it is sufficient for the receiver 20 to apply digital signal processing only on a short length of portion of the frame, which enables to reduce the circuit scale, compared with a case of performing the processing for one entire frame. Additionally, the receiver 20 is able to perform the frame synchronization on the basis of the position of the control information, even unless the receiver 20 is able to perform the frame synchronization of the primary signal.

Note that the frame synchronization described here requires no such a highly-precise synchronization as symbol synchronization and tolerates a certain level of error, because it is sufficient to capture a signal including a pattern in which electricity concentrates at a particular frequency.

The method for frame synchronization may use, for example, a method described in International Patent Publication WO/2010/134321.

Further, the above-described alternating signal modulated by the control information is transmitted being time-multiplexed by frame period, and therefore, the frame period can be used also for a clock of the control information sequence.

(3) BPF Characteristics

The receiver 20 extracts a pattern sequence (hereinafter, also referred to as a special pattern sequence) in which electricity concentrates at a particular frequency, and passes the special pattern sequence through the band-pass filter (BPF) whose center frequency of the transmission band is that particular frequency. The signal that has passed through the BPF has most of its electricity occupied by the special pattern sequence. Characteristics of the BPF is improved to pass though only the special pattern sequence by adopting a sharp BPF being able to steeply drop down the transmission rate at the cut-off frequency. This makes it possible to suppress leakage of electricity from signals other than the special pattern sequence, and thus to reduce interference caused by other signals when extracting the special pattern sequence.

For example, if the characteristic of the BPF is an order of tens to hundreds MHz of the transmission width at which the damping ratio is around 20 dB, it is possible to achieve a suppression ratio sufficient for extracting the special pattern sequence. This requires a BPF having a relatively long time tap coefficient as long as hundreds to thousands symbols, but, applying a BPF in a frequency domain using the fast Fourier transform (FFT) and the inverse fast Fourier transform (IFFT) enables to reduce the circuit scale.

(4) Frequency Offset Estimation Method

The optical transmission and reception system 100 performs coherent reception using a separate laser for the transmitter 10 and the receiver 20. Therefore, the received electric field obtained by the coherent reception generally has a frequency offset. This frequency offset of a laser is defined as 2.5 GHz by the Optical Internetworking Forum (OIF), and therefore, the frequency offset for the transmission and reception is considered at maximum 5 GHz that is twice as the above frequency offset of the laser. Accordingly, the special pattern sequence received by the receiver 20 has a frequency offset, and the center frequency of the transmission band of the BPF may need to be regulated such that the BPF is able to accommodate the maximum frequency offset.

The receiver 20 in the third embodiment, converts the received electric field into a signal in a frequency domain by Fourier transformation. In this case, the frequency offset for the special pattern sequence is able to be detected by detecting a position of the peak frequency on the frequency spectrum. For example, in a case in which a symbol rate is 32 GHz; a sampling rate 64 GHz; the special pattern sequence, the alternating signal of "−S, S, −S, S, . . . , −S, S"; an FFT size for the Fourier transformation 4,096 points, the peak position on the spectrum of the special pattern sequence is ±16 GHz. That is, because the 1024th and the 3072th points correspond to ±16 GHz respectively, the 1024th and the 3072th points should have the spectrum peak stand. However, if the frequency offset is 3 GHz, the peak position shifts by 192 points (=4096×3/64), and then is detected in the vicinity of the 1216th and 3264th points. And then, when the peak position of the spectrum of the special pattern sequence actually received are detected as 1216th and 3264th points, the deviation is found out as 192 points, and thus the offset is found out as +3 GHz. Then, an output signal converted by FFT is able to be cyclically shifted by −192 points to be compensated for the frequency offset.

As described above, the transmitter 10 of the present embodiment generates a differentially coded signal by differential coding the control information; modulates a signal sequence in which electricity concentrates at a particular frequency with the differentially coded signal; time-division multiplexes the modulated signal sequence with a primary signal of one of the two polarized wave components, and time-division multiplexes the signal sequence itself in which electricity concentrates at the particular frequency as is, with the primary signal of the other polarized wave; and then, polarization-multiplexes the both of the time-division multiplexed polarized wave into an optical signal, and transmits the optical signal to the receiver 20 through the optical fiber 5. The receiver 20 polarization-separates the received optical signal; and applies AD conversion on the separated polarized waves to generate two digital received-signals of the polarized waves; identifies the position of the signal sequence in which electricity concentrates at the particular frequency based on the particular frequency in the digital received-signals of the polarized waves; and then, based on the identified position, extracts the signal sequences in which electricity concentrates at the particular frequency from the digital received-signals of the polarized waves; applies differential detection on the extracted signal sequences to demodulate the control information. Accordingly, the optical transmission and reception system 100 having the transmitter 10 and the receiver 20 of this embodiment is able to transmit and receive the control information without deteriorating the primary signal and without depending on the state of demodulation of the primary signal.

Note that the present embodiment is described such that the polarization modulation is performed by changing the phase relationship between the two signals to be polarization-multiplexed, but the polarization modulation may be performed using other means for polarization modulation such as a polarization modulator, or the present embodiment may be applied to an optical transmission and reception of a single polarized wave that is not polarization-multiplexed.

Moreover, it is described that the control information is transmitted in the binary of the inverted or the non-inverted values, but may be transmitted and received in more than two levels by performing phase-modulation with granularity smaller than binary level, similarly to the extension from binary of the binary-level PSK to m-values of the m-level PSK. For example, in the case of FIG. 2, the transmitter is configured to modulate only the known signal being multiplexed in the Y polarized wave, but the transmitter may be configured to modulate also the known signal multiplexed in the X polarized wave. In this case, the output of the known signal sequence modulator 112 is connected to both the signal multiplexers 102x and 102y. Specifically, for example, in the case in which the known signal sequence is "−S, S, −S, S, . . . , −S, S", when the output of the differential coder 111, D(n)=1, the known signal sequence modulator 112 may output the same sequence "−S, S, −S, S, . . . , −S, S" to the signal multiplexer 102x and 102y; and when the output of the differential coder 111, D(n)=0, the known signal sequence modulator 112 may output: to the signal multiplexer 102x, considering the phase $\exp(j\theta)$, "−Sexp(j$\theta$), Sexp(j$\theta$), −Sexp(j$\theta$), Sexp(j$\theta$), . . . , −Sexp(j$\theta$), Sexp(j$\theta$);" and, to the signal multiplexer 102y, "−Sexp(j($\pi$+$\theta$)), Sexp(j($\pi$+$\theta$)), −Sexp(j($\pi$+$\theta$)), Sexp(j($\pi$+$\theta$)), . . . , −Sexp(j($\pi$+$\theta$)), Sexp(j($\pi$+$\theta$))". Note that $0 \leq \theta < 2\pi$.

Also, it is described of the case of using two frequencies as the particular frequency, but, in the case without performing the wavelength dispersion estimation, it is also possible to transmit and receive the control information using a single particular frequency.

In addition, FIG. 5A shows the process in the order of the processing by the buffer 211x (211y) before the processing by the BPF unit 212x (212y), but it is also possible to perform the processing by the BPF unit 212x (212y) and then the processing by the buffer 211x (211y).

Furthermore, the above description explains that the control information is transmitted and received using the polarization modulation, but it is also possible to transmit and receive the control information, using Frequency Shift Keying (FSK) modulation, by switching from one to another signal sequence in which electricity concentrates at different particular frequencies and used for sending the control information that is time-division multiplexed with a primary signal. In this case, the control information is also able to be transmitted and received without deteriorating the primary signal, because the control information is time-division multiplexed with the primary signal.

REFERENCE SIGNS LIST

5: Optical fiber
10: transmitter
20: receiver
100: optical transmission and reception system
101x: transmission signal modulator (first signal multiplexer)
101y: transmission signal modulator (second signal multiplexer)
102x: signal multiplexer (first signal multiplexer)
102y: signal multiplexer (second signal multiplexer)
103x. 103y: electro-optical transducer
104: polarization-multiplexer
110: control signal modulator
111: differential coder
112: known signal sequence modulator
120: known signal generator
130: transmission signal sequence
201: polarization separator (reception side converter)
202x, 202y: opto-electric transducer (reception side converter)
203x. 203y: AD converter (reception side converter)
204x, 204y: wavelength dispersion compensator
205: adaptive equalizer
206x, 206y: demodulator
210, 210a, 210b, 210c, 210d: known signal sequence demodulator
211x, 211y: buffer (part of control signal demodulator)
212x, 212x-1 to 212x-Nb: BPF unit
212y, 212y-1 to 212y-Nb: BPF unit
213, 213-1 to 213-Nb: differential decoder (control signal demodulator)
214: determinator (part of control signal demodulator)
215: known signal detector
216x, 216y: frequency offset compensator (part of control signal demodulator)
217, 217a: frequency offset estimator
218x, 218y: FFT unit
219x, 219y: filter
220x, 220y: IFFT unit
221: synthesizer (part of control signal demodulator)

The invention claimed is:

1. An optical transmission and reception system comprising a transmitter and a receiver,
the transmitter including:
a known signal generator configured to output a known signal sequence;
a control signal modulator configured to phase-modulate the known signal sequence using control information;
a transmitter-transducer configured to transduce output signals of the known signal generator and the control signal modulator from electricity to light respectively and;
a polarization-multiplexer configured to polarization-multiplex the output signals transduced to generate an optical signal, and
the receiver including:
a reception-transducer configured to receive the optical signal outputted from the transmitter and to transduce the optical signal received into electrical signals separated by every polarized wave component;
an analog to digital converter configured to convert the electrical signals to digital received-signals; and
a control signal demodulator configured to extract a phase relationship between the digital received-signals to demodulate the digital received-signals to the control information based on the phase relationship extracted.

2. The optical transmission and reception system according to claim 1, wherein the transmitter further includes:
a first primary signal multiplexer primary signal modulator configured to receive and modulate a first polarized wave of transmission information to generate a first primary signal, and
a first signal multiplexer configured to apply time-division multiplexing on the first primary signal generated and the output signal of the known signal generator; and
a second primary signal modulator configured to receive and modulate a second polarized wave of transmission information to generate a second primary signal, and
a second signal multiplexer configured to apply time-division multiplexing on the second primary signal generated and the output signal of the control signal modulator.

3. The optical transmission and reception system according to claim 1, wherein
the transmitter further includes the known signal generator configured to generate and output a signal sequence in which electricity concentrates at a particular frequency as the known signal sequence; and
the receiver further includes a known signal detector configured to identify, on the basis of the particular frequency, a position of the signal sequence in which electricity concentrates at the particular frequency, and
the control signal demodulator is further configured to extract the signal sequences in which electricity concentrates at the particular frequency from the digital received-signals separated by each of the polarized wave components on the basis of the position identified by the known signal detector, and to demodulate the signal sequences extracted to the control information on the basis of the phase relationship between the signal sequences extracted.

4. The optical transmission and reception system according to claim 3, wherein
the transmitter includes the control signal modulator further configured to differentially code the control information to generate a differentially coded signal; and to phase-modulate the signal sequence in which electricity concentrates at the particular frequency, using the differentially coded signal, and
the receiver includes the control signal demodulator further configured to extract, the signal sequences in which electricity concentrates at the particular frequency from the digital received-signals separated by each of the polarized wave components on the basis of the position identified by the known signal detector; to demodulate the signal sequences extracted to the differentially coded signal based on the phase relationship between the signal sequences extracted; and to apply differential detection on the differentially coded signal to obtain the control information.

5. The optical transmission and reception system according to claim 3, wherein the receiver is configured to compensate for a frequency offset, when extracting the signal sequence in which electricity concentrates at the particular frequency from the digital received-signal.

6. The optical transmission and reception system according to claim 5, wherein
the receiver is configured to convert the digital received-signal separated by every polarized wave component into a signal in a frequency domain to estimate the frequency offset, when compensating for the frequency offset.

7. The optical transmission and reception system according to claim 6, wherein
the receiver is configured to apply Fast Fourier Transform (FFT) on the digital received-signal separated by every polarized wave component to obtain the signal in the frequency domain, when estimating the frequency offset.

8. The optical transmission and reception system according to claim 1, wherein
the receiver includes a determinator in the control signal demodulator, the determinator normalizing the digital received-signal separated by every polarized wave component before performing bit determination, and using the digital received-signal normalized before the determination to perform bit determination of the control information.

9. An optical transmission and reception method executed by an optical transmission and reception system comprising a transmitter and a receiver,
comprising steps executed by the transmitter of:
generating a known signal sequence, the known signal sequence being a signal sequence known in advance;
phase-modulating the known signal sequence using control information;
transducing output signals outputted by the generating and the phase-modulating from electricity to light respectively; and
polarization-multiplexing the output signals transduced to generate and to output an optical signal, and
steps executed by the receiver of:
receiving the optical signal outputted by the polarization-multiplexing step;
transducing the optical signals separated by every polarized wave component to electrical signals;
converting the electrical signals to digital received-signals;
extracting a phase relationship between the digital received-signals; and
demodulating the digital received-signals to the control information based on the phase relationship extracted.

10. An optical transmission and reception method executed by an optical transmission and reception system comprising a transmitter and a receiver, the method comprising steps executed by the transmitter of:

a known signal generating step of outputting a signal sequence in which electricity concentrates at a particular frequency as a known signal sequence;

a control signal modulation step of differentially coding control information to generate a differentially coded signal, and modulating the signal sequence in which electricity concentrates at the particular frequency;

a first signal multiplexing step of applying time-division multiplexing on a first primary signal generated by modulating a first polarized wave of transmission information and the signal sequence in which electricity concentrates at the particular frequency;

a second signal multiplexing step of applying time-division multiplexing on a second primary signal generated by modulating a second polarized wave of transmission information and the signal sequence modulated by the control signal modulation step; and a transmission-transducing of transducing output signals outputted by the first and second signal multiplexing steps from electricity to light respectively; and a polarization-multiplexing step of polarization-multiplexing the output signals transduced by the transmission-transducing step to generate and to output an optical signal, and the method further comprising steps executed by the receiver of:

a reception-transducing step of receiving the optical signal outputted by the polarization-multiplexing step, and transducing the optical signals separated by every polarized wave component to electrical signals;

an analog-digital-converting step of converting the electrical signals to digital received-signals;

a known signal detecting step of identifying a position of the signal sequence in which electricity concentrates at the particular frequency, in the digital received-signal in each polarized wave, on the basis of the particular frequency; and a control signal demodulating step of extracting both of the signal sequence in which electricity concentrates at the particular frequency and the signal sequence modulated by the control signal modulation step from the digital received-signals in each of the polarized waves on the basis of the position identified by the known signal detecting step, and demodulating both of the signal sequences extracted to the differentially coded signal on a basis of a modulation difference between the both of the signal sequences extracted, and decode the differentially coded signal to the control information by differential detection.

* * * * *